(12) United States Patent
Tschirschke

(10) Patent No.: US 9,732,631 B2
(45) Date of Patent: Aug. 15, 2017

(54) EXHAUST-GAS TURBOCHARGER

(75) Inventor: Hans-Juergen Tschirschke, Hettenleidelheim (DE)

(73) Assignee: BorgWarner Inc., Auburn Hills, MI (US)

(*) Notice: Subject to any disclaimer, the term of this patent is extended or adjusted under 35 U.S.C. 154(b) by 713 days.

(21) Appl. No.: 13/879,811

(22) PCT Filed: Oct. 21, 2011

(86) PCT No.: PCT/US2011/057252
§ 371 (c)(1),
(2), (4) Date: Apr. 17, 2013

(87) PCT Pub. No.: WO2012/061040
PCT Pub. Date: May 10, 2012

(65) Prior Publication Data
US 2013/0302158 A1 Nov. 14, 2013

(30) Foreign Application Priority Data

Oct. 25, 2010 (DE) ........................ 10 2010 049 519

(51) Int. Cl.
F01D 25/24 (2006.01)
F01N 13/10 (2010.01)
F01N 13/18 (2010.01)
F02B 37/00 (2006.01)
F02B 67/10 (2006.01)
F02C 6/12 (2006.01)

(52) U.S. Cl.
CPC ............. *F01D 25/24* (2013.01); *F01N 13/10* (2013.01); *F01N 13/1805* (2013.01); *F02B 37/00* (2013.01); *F02B 67/10* (2013.01); *F02C 6/12* (2013.01); *F01N 2450/22* (2013.01); *Y02T 10/144* (2013.01); *Y10T 29/49398* (2015.01)

(58) Field of Classification Search
CPC ........ F01D 25/24; F01D 25/243; F01D 25/26; F01D 25/265; F01D 25/28; F01D 25/30
USPC ......... 415/189, 196, 204, 205, 213.1, 214.1, 415/215.1; 285/125.1, 129.1, 129.2, 285/130.1, 132.1, 288.1, 405, 416
See application file for complete search history.

(56) References Cited

U.S. PATENT DOCUMENTS

| 2,807,934 | A | * | 10/1957 | Purvis | F23R 3/60 248/554 |
| 4,689,952 | A | * | 9/1987 | Arthur | F01N 13/10 29/428 |
| 7,234,302 | B2 | * | 6/2007 | Korner | F01D 9/026 285/41 |
| 2005/0126163 | A1 | * | 6/2005 | Bjornsson | F01N 13/102 60/323 |
| 2009/0200795 | A1 | | 8/2009 | Riekers et al. | |
| 2010/0038901 | A1 | * | 2/2010 | Schmidt | F01N 13/102 285/294.1 |

FOREIGN PATENT DOCUMENTS

EP 1541826 A1 6/2005

* cited by examiner

Primary Examiner — Richard Edgar
Assistant Examiner — Su Htay
(74) Attorney, Agent, or Firm — Eric L. Doyle; Stephan A. Pendorf; Patent Central LLC

(57) ABSTRACT

An exhaust-gas turbocharger (1) having a turbine housing (2), and having an exhaust manifold (3) connected to the turbine housing (2). At least one adapter ring (4, 5) is arranged between the turbine housing (2) and the exhaust manifold (3).

3 Claims, 3 Drawing Sheets

EXHAUST-GAS TURBOCHARGER

Figure 1:
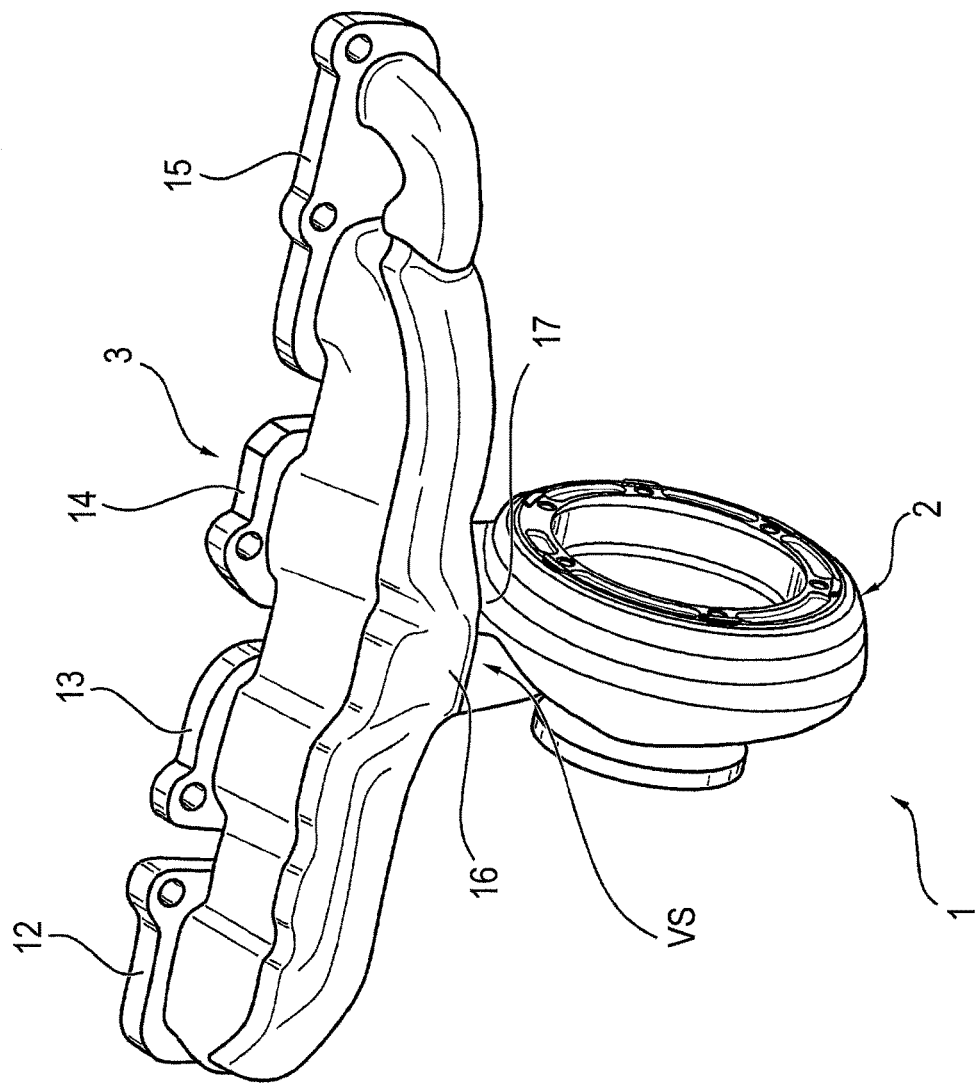

The invention relates to an exhaust-gas turbocharger according to the preamble of claim 1.

If the turbine housing of an exhaust-gas turbocharger is combined with an exhaust manifold to form a manifold module, in the case of known constructions, there are often problems with regard to the positional accuracy of the two components relative to one another.

It is therefore an object of the present invention to provide an exhaust-gas turbocharger of the type specified in the preamble of claim 1 which allows a reduction in positional deviation between the exhaust manifold and the turbine housing.

It is also an object of the invention to provide a sheet-metal manifold module which likewise allows a reduction in positional deviation between the exhaust manifold and the turbine housing.

Finally, it is an object of the present invention to provide a method for producing a sheet-metal manifold module of said type.

Through the use of at least one compensating adapter ring on the exhaust manifold side or on the turbine housing side, it is possible during the welding process to attain reduced positional deviations between the exhaust manifold and the turbine housing as a result of reduced thermal distortion.

Furthermore, there is a resulting reduction in production costs and an improvement in machining accuracy through the use of fewer complex individual parts.

In a particularly preferred embodiment of the method according to the invention, firstly the turbine housing and the exhaust manifold are produced as semifinished parts or as fully machined individual parts, preferably as double-walled sheet-metal components.

In the next method step, one adapter ring is fastened, preferably welded, either to the turbine housing or to the exhaust manifold. A second adapter ring is subsequently placed in loose connection with the second part.

In the next method step, the adapter rings are aligned and fixedly connected to one another, wherein again preferably welding is used to provide the connection.

Finally, in the last method step, the second adapter ring is aligned and fastened to the respective second component (that is to say either to the exhaust manifold or to the turbine housing), which again takes place preferably by welding.

If required, as a further preferred method step, it is also possible for machining of the exhaust manifold flange to take place after the welding process, in order to be able to compensate for any distortion which has occurred.

Furthermore, in a particularly preferred embodiment of the method according to the invention, it is possible, for tolerance narrowing of the turbine housing and/or of the exhaust manifold, for the components to be finish-machined separately, and for the above-described welding processes to first be carried out thereafter.

As already explained above, when the method according to the invention is applied, the position tolerance of the turbine housing relative to the exhaust manifold is improved through the use of the position-compensating adapter rings, preferably on both components.

Figure 2:
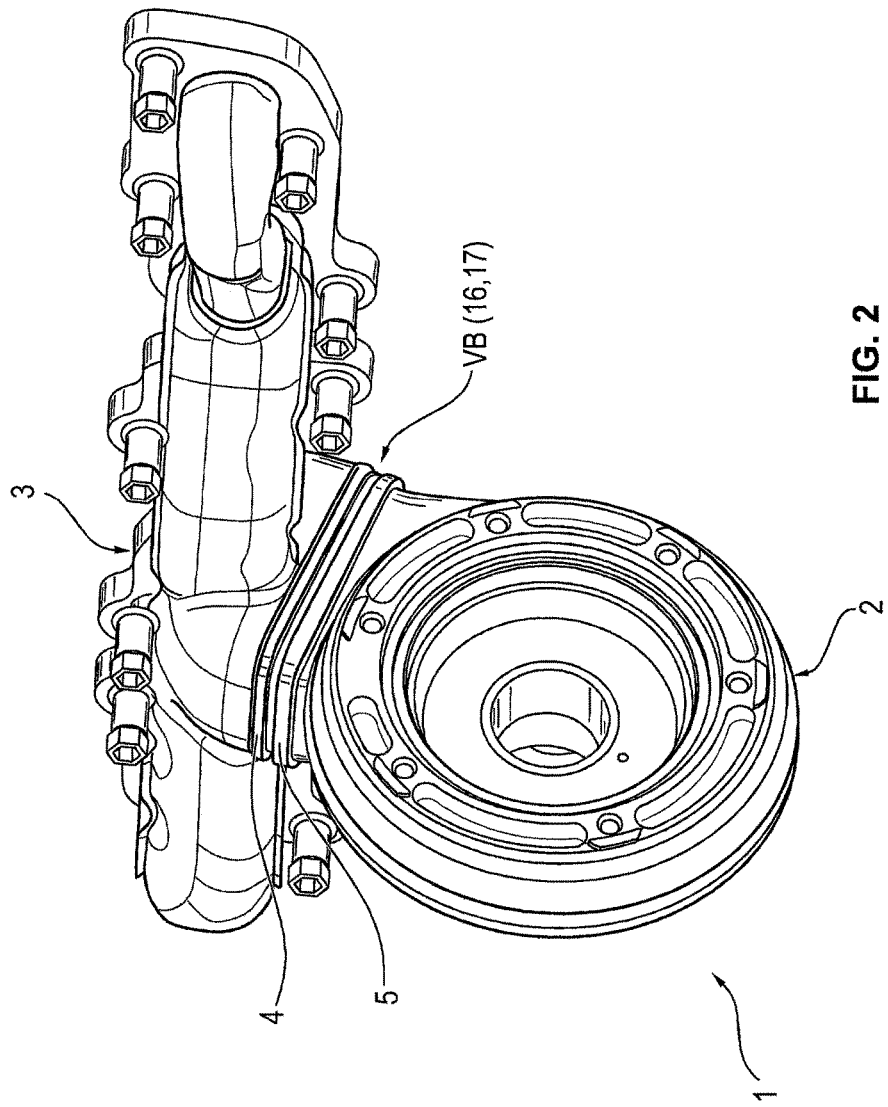
Figure 3:
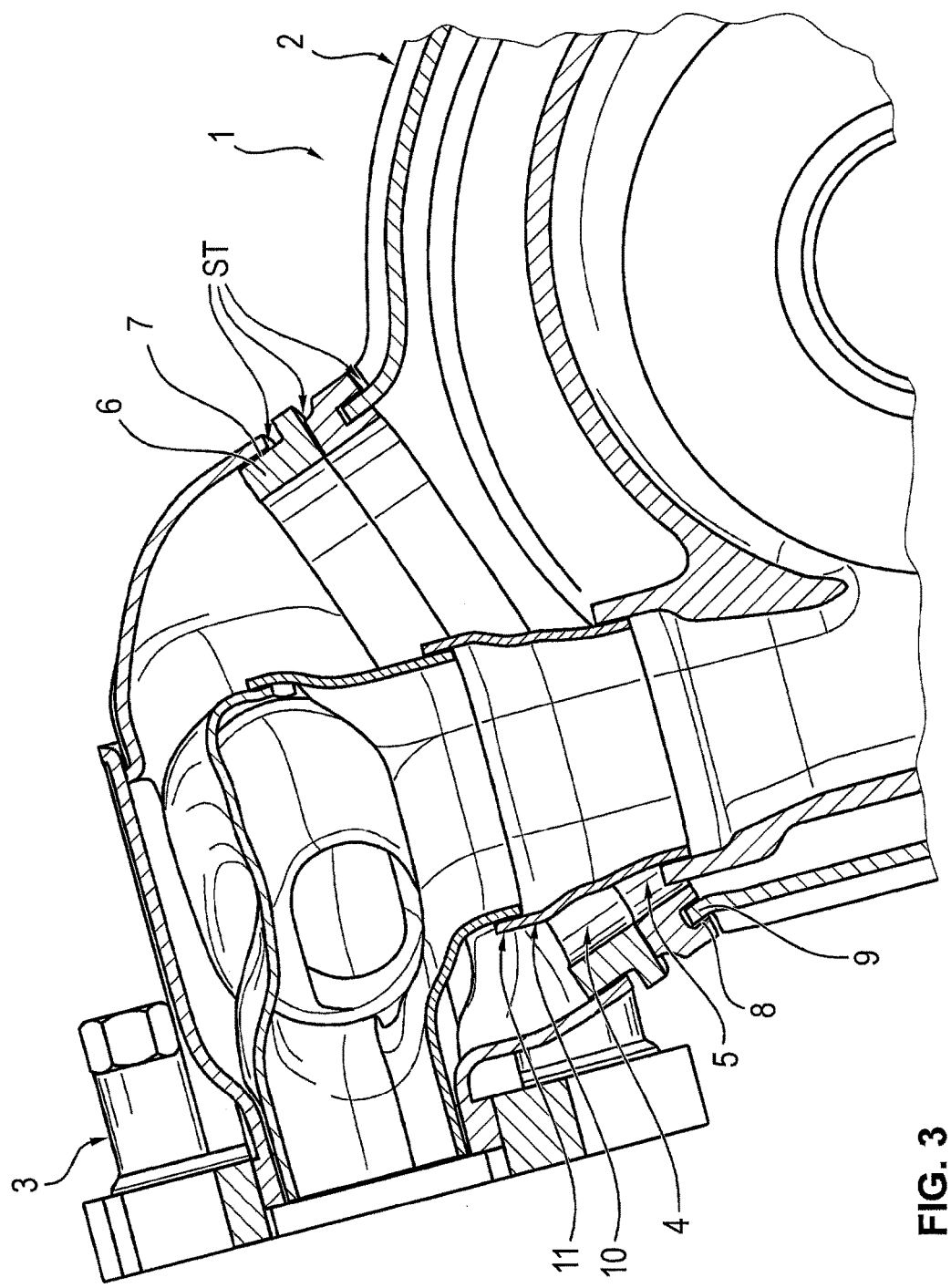

Further details, advantages and features of the present invention will emerge from the following description of exemplary embodiments on the basis of the appended drawing, in which:

FIG. 1 shows a perspective illustration of a first embodiment of the exhaust-gas turbocharger according to the invention, FIG. 2 shows a further perspective illustration of the exhaust-gas turbocharger according to the invention, and FIG. 3 shows a partial section through the exhaust-gas turbocharger according to FIG. 2.

FIG. 1 illustrates an exhaust-gas turbocharger 1 according to the invention, represented by its turbine housing 2. The exhaust-gas turbocharger 1 self-evidently also has all the other components of conventional exhaust-gas turbocharger, such as in particular a compressor with compressor wheel, a bearing housing with shaft, and a turbine wheel arranged in the turbine housing 2. Said parts are however not illustrated because they are not required for explaining the principles of the present invention.

The turbine housing 2 of the exhaust-gas turbocharger 1 is connected to an exhaust manifold 3, wherein the turbine housing 2 and the exhaust manifold 3 are preferably double-walled sheet-metal components.

The exhaust manifold 3 has fastening flanges 12 to 15, by means of which it can be fastened, in the installed state of the exhaust-gas turbocharger 1, to an internal combustion engine not illustrated in FIG. 1. Proceeding from the flanges 12 to 15, the pipe system of the exhaust manifold 3 runs to the manifold outlet 16, which is connected to a turbine housing inlet 17 for supplying exhaust gases from the internal combustion engine to the turbine wheel. The connecting point is denoted by the arrow VS in FIG. 1 and will be explained in detail below on the basis of the embodiment illustrated in FIGS. 2 and 3.

The illustration of the exhaust manifold 3 in FIGS. 2 and 3 is slightly different to the illustration of the exhaust manifold 3 in FIG. 1, but both turbochargers are based on the principle according to the invention of providing one, though preferably two, adapter rings 4 and 5 in a connecting region denoted in FIG. 2 by the reference numeral VB. The connecting region VB in turn is formed by the manifold outlet 16 and by the turbine housing inlet 17, wherein the adapter ring 4 is the manifold-side adapter ring, whereas the adapter ring 5 is the turbine-side adapter ring. The embodiment illustrated in FIGS. 1 to 3 uses preferably double-walled sheet-metal components for the exhaust manifold 3 and the turbine housing 2, wherein the internal pipe system 10 illustrated in FIG. 3 has a plug-in connection 11 with a degree of play.

In the embodiment illustrated in the figures, the manifold-side adapter ring 4 is provided with a plug-in region 6 which is engaged around by a receiving region 7 of the exhaust manifold 3 in the assembled state according to FIG. 3.

The turbine-side adapter ring 5 has an annularly encircling groove 8 into which a plug-in flange 9 of the turbine housing 2 engages in the assembled state. The welding is carried out at the points denoted by the three arrows ST in FIG. 3, with the above-explained approach of the method according to the invention being applied.

As has likewise already been explained in the introduction, in each case one associated adapter ring is used both on the side of the exhaust manifold 3 and also on the side of the turbine housing 2. It is however also conceivable in principle for a single adapter ring to be used to realize the required position compensation.

In addition to the written disclosure of the invention, reference is hereby explicitly made to the diagrammatic illustration thereof in FIGS. 1 to 3.

LIST OF REFERENCE SYMBOLS

1 Exhaust-gas turbocharger
2 Turbine housing

3 Exhaust manifold
4 Manifold-side adapter ring
5 Turbine-housing-side adapter ring
6 Plug-in region
7 Receiving region
8 Annular grooves
9 Plug-in flange
10 Internal pipe system
11 Plug-in connection
12-15 Flanges of the exhaust manifold 3 for mounting on the engine
16 Manifold outlet
17 Turbine housing inlet
VS Connecting point (weld between turbine housing 2 and exhaust manifold 3)
VB Connecting region
ST Weld points

The invention claimed is:

1. An exhaust-gas turbocharger (1) including
   a turbine housing (2), wherein the turbine housing (2) is a double-walled sheet metal part comprising an outer wall and an inner wall,
   an exhaust manifold (3), wherein the exhaust manifold (3) is a double-walled sheet metal part comprising an outer wall and an inner wall, and
   a turbine-housing-side adapter ring (5) having first and second sides, the first side including a flange mating surface, the second side having an annularly encircling groove (8) into which a plug-in flange (9) of turbine housing outer wall engages, wherein the turbine-housing-side adapter ring (5) second side is welded to the turbine housing (2) outer wall, and
   an exhaust manifold-side adapter ring (4) having first and second sides, the first side including a flange mating surface complementary to the turbine-housing-side adapter ring (5) flange mating surface, wherein the manifold-side adapter ring (4) second side is provided with a plug-in region (6) which is engaged around by and welded to a receiving section (7) of the exhaust manifold (3) outer wall,
      wherein the turbine-housing-side adapter ring (5) flange mating surface is welded to the manifold-side adapter ring (4) flange mating surface.

2. A double-walled sheet metal manifold module including
   a double-walled turbine housing (2) comprising an internal turbine housing wall and an external turbine housing wall,
   a double-walled exhaust manifold (3) comprising an internal manifold wall and an external manifold wall,
   a turbine-housing-side adapter ring (5) having first and second sides, the first side welded to the turbine housing (2) external turbine housing wall, and
   a manifold-side adapter ring (4) having first and second sides, the first side welded to the exhaust manifold (3) external exhaust manifold wall and the second side welded to the turbine-housing-side adapter ring (5) second side.

3. A method for producing a double-walled sheet-metal manifold module, having the following method steps:
   (a) forming a double-walled turbine housing (2) comprising an outer wall and an inner wall,
   (b) forming a double-walled exhaust manifold (3) comprising an outer wall and an inner wall,
   (c) forming a manifold-side adapter ring (4) having first and second sides, the first side including a flange mating surface, the second side adapted to being welded to the exhaust manifold (3),
   (d) forming a turbine-housing-side adapter ring (5) having first and second sides, the first side including a flange mating surface complementary to the manifold-side adapter ring (4) flange mating surface, the second side adapted to being welded to the turbine housing (2), and
   (e1) welding the manifold-side adapter ring (4) second side to the manifold, aligning the turbine housing to the manifold, aligning the turbine housing adapter ring (5) relative to the turbine housing, welding the two adapter rings (4, 5) to one another at their first sides, and welding the turbine-housing-side adapter ring second side to the turbine housing, or
   (e2) welding the turbine-housing-side adapter ring (5) second side to the turbine housing, aligning the manifold to the turbine housing, aligning the manifold adapter ring (4) relative to the manifold, welding the two adapter rings (4, 5) to one another at their first sides, and welding the manifold-side adapter ring second side to the manifold.

* * * * *